April 23, 1957  A. BORER  2,789,312
APPARATUS FOR MAKING HOLLOW ARTICLES
OF THERMOPLASTIC MATERIAL
Filed Oct. 21, 1953  6 Sheets-Sheet 1

Inventor:
Alfred Borer
by his Attorneys
Howson & Howson

United States Patent Office 2,789,312
Patented Apr. 23, 1957

2,789,312

APPARATUS FOR MAKING HOLLOW ARTICLES OF THERMOPLASTIC MATERIAL

Alfred Borer, Wallbach, Switzerland, assignor to T. C. Wheaton Company, Mays Landing, N. J., a corporation of New Jersey Application October 21, 1953, Serial No. 387,431

4 Claims. (Cl. 18—5)

This invention relates to the manufacture of hollow articles, such as bottles, from thermoplastic material such as polyethylene. This application is a continuation-in-part of my copending application Serial No. 167,852, filed June 13, 1950, and now abandoned.

The present invention has for its principal object the provision of a satisfactory method and a satisfactory apparatus for the production of so-called plastic bottles and like articles.

Plastic bottles are much to be preferred over glass bottles for many uses, and consequently, there is an ever-increasing demand for plastic bottles. Such bottles are unbreakable and they lend themselves to manufacture as "squeeze bottles," in many instances eliminating the need for an atomizer.

One method of making plastic bottles is that which comprises the steps of extruding a tube, closing one end of the tube by squeezing, and finally blowing the tube to the size and shape of the desired bottle. This method has certain disadvantages, but it has been used in the past for lack of a better method. Among the objections or disadvantages of this method are that it is impossible to make a preform of any desired shape or wall variation for blowing to any desired form in the finished bottle and, furthermore, the bottle formed by this method has a seam due to the required squeezing of one end of the extruded tube. Since extrusion does not lend itself to control of shape or varying wall thickness, a bottle formed by this method may have a thin wall in the areas of greatest expansion and a thick wall in the areas of least expansion.

Another method long ago proposed for the making of plastic bottles is that which comprises the steps of producing a preform in a preform mold by injecting material into the closed mold, transferring the preform to a finishing or blow mold, and blowing the preform in the latter mold to the size and shape of the desired bottle. This method does not have the disadvantages of the first-mentioned method. It is possible by the use of an injection mold accurately to control the formation of the preform. By injecting the material about a core within a preform mold of a particular shape, it is possible to produce a suitable preform for the blowing of any desired bottle. Furthermore, this method does not produce any seam in the finished bottle. Notwithstanding the advantages of this method, it has been unsuccessful in the past, although it has been tried repeatedly by those well versed in the art of bottle making. In view of the desirability of this method, its failure presented a real problem which has long remained unsolved.

The principal object of the present invention is to provide a solution of the above-mentioned problem, and to provide a commercially satisfactory method and apparatus employing the injection principle.

Through extensive experimentation I have found that the successful production of plastic bottles and like articles, by the injection formation of a preform and subsequent blowing of the preform, can only be achieved by: (1) heating the thermoplastic material to a suitable temperature which, in the case of polyethylene, is about 400° to 450° F., (2) injecting the heated material into the preform mold to form the preform and transferring the preform to the blow mold, all in as short a time as possible and necessarily within a time interval sufficiently short to preclude detrimental setting of the thermoplastic material, and (3) blowing the preform within the blow mold immediately following the transfer of the preform to the blow mold, and cooling the formed bottle sufficiently to effect substantially complete setting of the thermoplastic material.

Of particular importance in this method is the criticality of the time interval between the commencement of injection of the heated thermoplastic material into the preform mold and the placement of the preform in the blow mold and closing of the latter. I have found that in order to insure consistent production of suitable plastic bottles, it is necessary that this time interval shall not exceed approximately seven seconds. It is important to note that there is an approximate limiting temperature to which the thermoplastic material may be heated as indicated above, as higher temperatures cause bubbling of the material, and it should be noted also that the successful production of a plastic bottle or like article requires that the blowing operation be performed while the thermoplastic material is in a suitable plastic state, i. e. at a temperature not less than about 185° to 210° F. Since the blowing operation requires only a very short time, for example a second or a few seconds, the critical factor is the condition of the material at the time of blowing.

The reasons for the criticality of the time interval between commencement of injection and placement of the preform in the blow mold may be explained as follows. Thermoplastic materials, such as polyethylene, are very poor heat conductors and they lose heat very rapidly. The rapid loss of heat from the outside of a body of such material that has previously been heated to a state of plasticity causes shrinkage of the material and causes a skin to form, which is the initial setting stage. When the material cools sufficiently for formation of a substantial skin on its outer surface, it is impossible to blow the material to form a hollow article such as a bottle. Although the interior of the body of material may be at high temperature, the exterior may be relatively cool due to the poor heat conductivity of the material.

In the production of a plastic bottle or like article by the injection formation of a preform and subsequent blowing of the preform, it is impractical to reheat the preform after formation thereof and prior to the blowing operation. This has been proposed in the past but it is entirely impractical because of the poor heat conductivity of thermoplastic material. If the preform has been properly formed but cools sufficiently to cause formation of a substantial skin, it cannot be blown in that condition, and if it is reheated and then blown there can be no assurance that the resulting bottle will be satisafctory. Therefore, in the successful production of plastic bottles by injection molding, the thermoplastic material can be heated only once, prior to the injection operation, and because of the character of the material it is necessary to form the preform and to accomplish placement thereof within the closed blow mold before detrimental setting of the thermoplastic material can take place.

It should be noted that the thermoplastic material commences to cool as soon as it enters the preform mold, and the cooling of the preform is at an increased rate during transfer of the preform from the preform mold to the blow mold and, furthermore, the necessity for opening of the molds further aggravates the problem. In order to carry out the method successfully, it is necessary to provide apparatus which is adapted to effect transfer of the preform from the preform mold to the blow mold within a very short time interval. This is accomplished according to the present invention by means of a simple apparatus in which the preform mold and the blow mold comprise half-mold sections and are arranged in parallel spaced relation, and the preform is carried in an arc between the preform mold and the blow mold about an axis of rotation which is parallel to the longitudinal axes of the two molds. Such arrangement is embodied in an automatic machine which is capable of producing plastic bottles at a very rapid rate.

With the foregoing in mind, the invention may be fully understood from the following detailed description with reference to the accompanying drawings. In the drawings.

Figure 1:
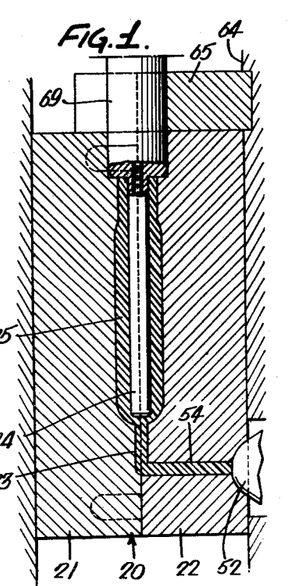
Fig. 1 is a sectional view taken through the preform mold with the mold closed and with the preform being formed therein.
Figure 2:
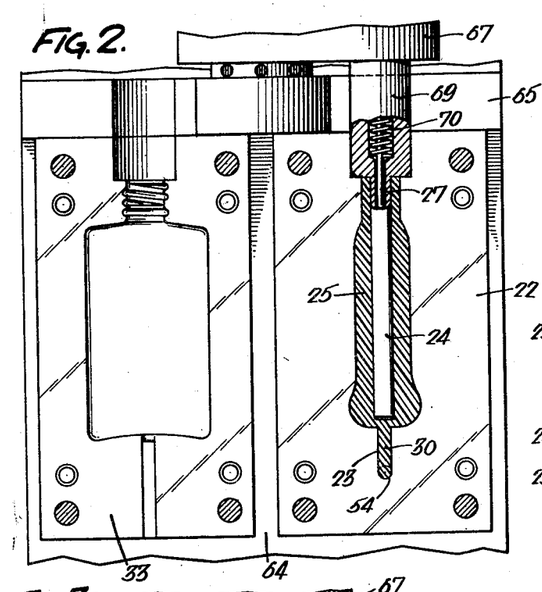
Fig. 2 is a face view of the stationary half-mold sections after opening of the molds.

Referring particularly to Figs. 1 to 4 of the drawings, these figures show the successive steps in the production of a plastic bottle according to this invention. The preform mold 20 comprises two half-mold sections 21 and 22, and with the mold closed, as shown in Fig. 1, the heated thermoplastic material is injected into the mold through passage 23 about a tubular core or mandrel 24 to form the preform 25. Extending within the tubular core 24 is a rod 27 (see Fig. 11) which is of smaller cross-section than the bore of core 24 and has a flange 28 at its lower end. The rod 27 is spring-biased upwardly so that during the injection operation the flange 28 engages the bottom of the tubular core 24, thus preventing the plastic material from entering the lower end of the core. At its lower end, rod 27 has angularly spaced projections 29 (see Figs. 11 and 12) which maintain the rod centered within core 24.

Figure 3:
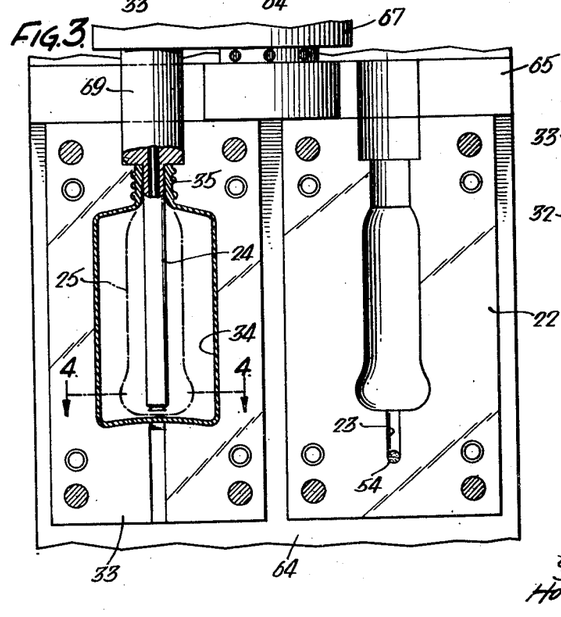
Fig. 3 is a view similar to Fig. 2, taken after the blowing operation.
Figures 10, 11, 12, 13:
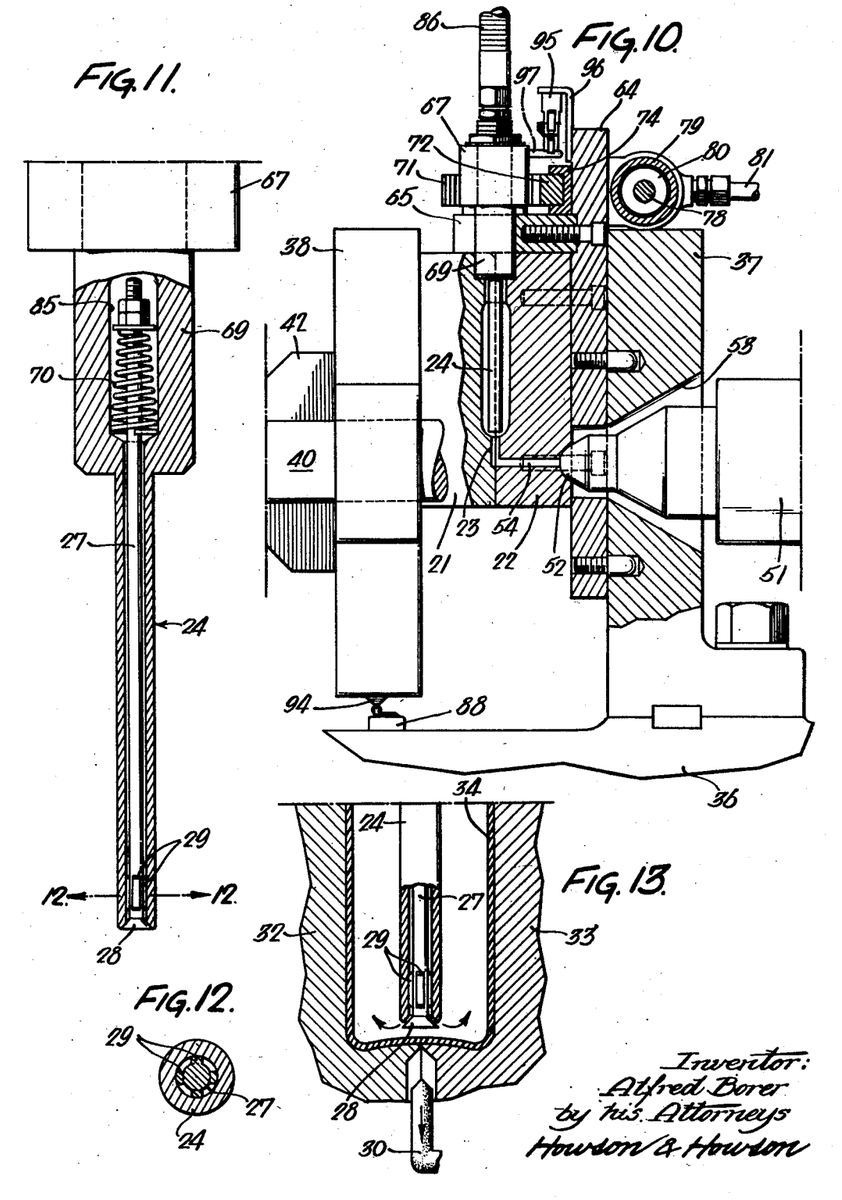
Fig. 10 is a vertical sectional view taken through the preform mold, showing more clearly the manner in which the injection operation is performed.
Fig. 11 is a longitudinal sectional and elevational view of the core or mandrel and its supporting spindle.
Fig. 12 is a sectional view taken on line 12—12 of Fig. 11.
Fig. 13 is a sectional view of the lower end of the tubular core during the blowing operation.

As previously mentioned, the heated thermoplastic material commences to cool as soon as it enters the preform mold, and in this connection it should be noted that the mold and the tubular core 24 absorb considerable heat from the material as they are necessarily at considerably lower temperature to avoid sticking or adhesion of the material. Following the formation of the preform, the molds are opened and the core and preform thereon are transferred to the blow mold, as shown in Fig. 3. Upon opening of the preform mold, the sprue or runner 30 may drop off of the preform or may be carried over to the blow mold where it will be cut off as shown in Fig. 13. As previously stated, it is essential that the transfer of the preform from the preform mold into the finishing or blow mold shall take place within a time interval from the commencement of injection into the preform mold sufficiently short to preclude detrimental setting of the thermoplastic material. Thus, it is necessary that the injection formation of the preform and the transfer of the preform to the blow mold take place within a critically short time interval which, preferably does not exceed approximately seven seconds. The reasons for this have been explained above.

Figure 4:
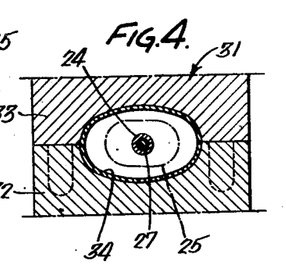
Fig. 4 is a sectional view taken through the blow mold along the plane indicated by line 4—4 in Fig. 3.

The blow mold 31 comprises two half-mold sections 32 and 33 whose lower portions are formed to cut off the sprue as above-mentioned. The upper portions of the mold sections are formed to hold the neck portion of the preform tightly against the core 24. With the preform in the blow mold and with the latter closed, as shown in Fig. 4, pressurized air is supplied to the upper end of the tubular core 24 and passes downward therethrough, impinging against flange 28 and forcing the rod 27 downwardly. The air expands the preform to the shape of the blow mold, thus forming the bottle 34. It should be noted that during the blowing operation the neck portion of the preform is tightly sealed against the core 24 so that the air cannot escape from the preform. The neck portion 35 of the bottle is formed by the contour of the upper part of the blow mold, and in the illustrated embodiment the upper part of the blow mold is formed to produce a thread on the neck portion of the bottle for attachment of an internally threaded cap.

Following the blowing of the bottle which requires only a few seconds at most, the blow mold remains closed for a period of time during which the air serves to cool the thermoplastic material sufficiently to effect substantially complete setting of the material. The air also cools the tubular core 24. The total blowing and cooling may be about fifteen seconds and may be as long as forty seconds, depending upon the size and weight of the bottle. The air is then cut off and the molds are opened, and the core 24 and formed bottle thereon are moved out of the blow mold. The bottle is removed and the core is returned to the preform mold.

Referring now to Figs. 5 to 14, these figures show a complete apparatus including the above-described preform and blow molds and including means for transferring the preform from the preform mold to the blow mold as quickly as possible. Referring first to Figs. 5 to 10, the machine comprises a supporting base 36 on which is mounted a stationary vertical plate 37. Associated with the plate 37 is a movable plate 38 which is parallel to the plate 37 and is arranged to move toward and away from plate 37. These two plates serve to support the half-mold sections of the molds. As may be seen in Fig. 6, the half-mold sections 21 and 32 are carried by the movable plate 38, while the half-mold sections 22 and 33 are supported by the stationary plate 37. The movement of plate 38 to effect opening and closing of the molds is accomplished by the arrangement now to be described.

Figures 5, 6:
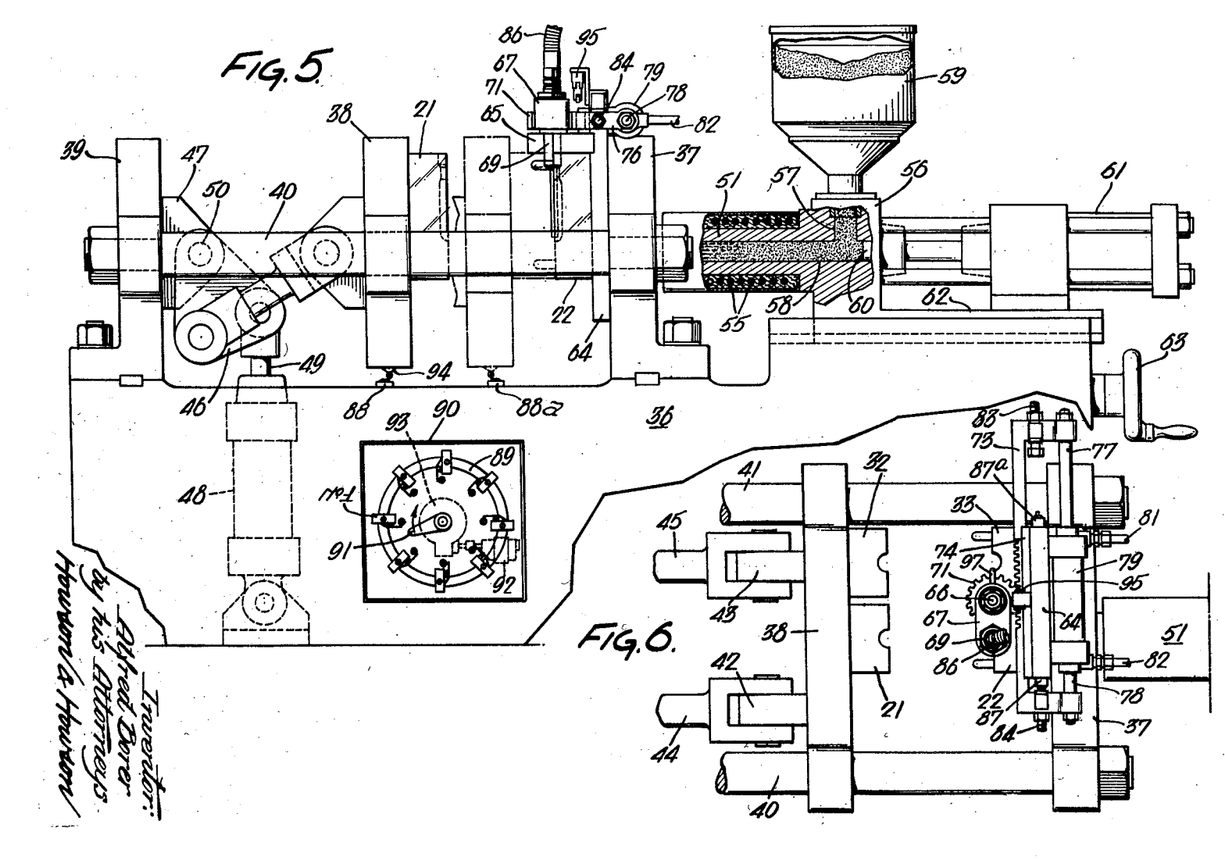
Fig. 5 is a side elevational view of a complete machine embodying the molds shown in Figs. 1 to 4.
Fig. 6 is a partial plan view showing the open molds.
Figure 7:
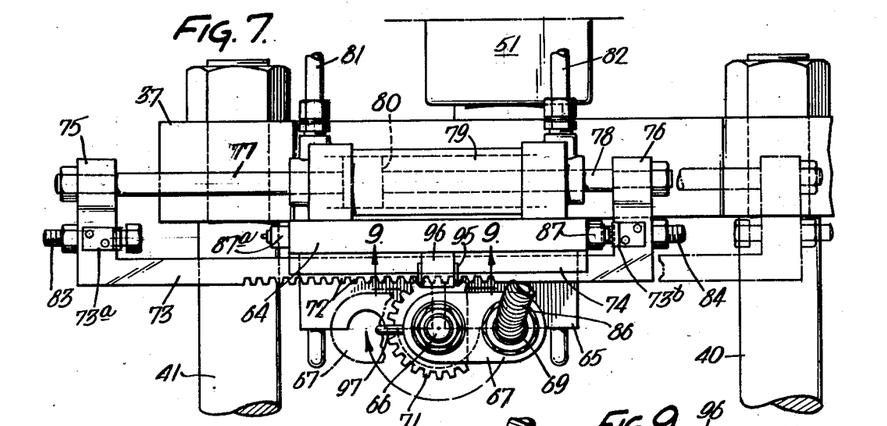
Fig. 7 is an enlarged fragmentary plan view showing the arrangement for transferring the preform.

As shown in Fig. 5, a stationary plate 39 is mounted on the supporting base 36 in spaced relation to the plate 37. A pair of parallel rods 40 and 41 extend between the stationary plates 37 and 39 and are secured thereto. The movable plate 38 has apertures to receive said rods and is slidably supported thereby. At the back plate 38 there are extending lugs 42 and 43 to which a pair of links 44 and 45 are pivotally connected. The other ends of these links are pivotally connected to a triangular plate 46 which is pivotally connected to a lug 47 on plate 39. A double-acting air cylinder 48 is pivotally connected to the supporting base 36, and the piston rod 49 of said cylinder is pivotally connected to the triangular plate 46. In the retracted position of the piston rod 49 the plate 38 is in the position shown in Fig. 5 and the molds are fully open. When the piston rod 49 is projected upwardly, the triangular plate 46 is moved counter-clockwise about its pivot 50 and actuates the plate 38 through the connecting links 44 and 45, thus causing plate 38 to move to the position shown in dot-and-dash outline in Fig. 5, in which position the molds are closed.

The injection of the thermoplastic material into the injection mold is accomplished by means of an injection cylinder 51 (Fig. 10) having an injection nozzle 52 which extends through an aperture 53 in the stationary plate 37. The thermoplastic material is forced through passage 54 and passage 23 after having been heated to plasticity by electrical heating means 55 (Fig. 5). The injection cylinder is integral with the charging chamber 56 which has passages 57 and 58 leading to the nozzle 52. The unheated thermoplastic material, which is in powdered form, gravitates from the feed hopper 59 through passage 57 and is brought into association with the heating coil 55 as described below.

The injection mechanism comprises a ram 60 which extends into passage 58 and is actuated by a double-acting air cylinder 61. In the arrangement shown the air cylinder 61 is mounted on a supporting base 62 which is integral with and extends from the charging chamber 56. The base 62 is slidably supported by the main base 36 so that the entire injecting assembly may be moved as a unit whenever desired. To this end, a hand wheel 63 may be provided together with suitable mechanism to effect sliding movement of the injecting assembly in response to turning of the hand wheel.

During each forward stroke of the ram 60, a fixed amount of the heated plastic material is injected into the preform mold to form the preform, and at the same time the powdered material at the entrance end of passage 58 is pushed forwardly to be heated. Upon retraction of the ram, more powdered material gravitates into the entrance portion of passage 58. The arrangement is such that just prior to each injection operation there is an ample quantity of heated material of desired plasticity for the making of a bottle in the succeeding operation.

In order to effect transfer of the preform from the preform mold to the blow mold, and also to effect return of the tubular core to the preform mold, the arrangement now to be described is provided. The half-mold sections 22 and 33 are mounted on a plate 64 which is secured to the stationary plate 37. Extending from the vertical plate 64 is a horizontal shelf 65 which supports a vertical pin 66 whose axis lies in the meeting plane of the relatively movable mold sections and is disposed midway between the longitudinal axes of the molds parallel thereto. The tubular core 24 is suspended from a carrier 67 which is supported by a bearing 68 on shelf 65 and is pivotally held by pin 66 so as to be freely rotatable about the pin. By this arrangement, the tubular core 24 is movable back and forth through 180° between the preform mold and the blow mold. As may be seen in Figs. 10 and 11, the core 24 is integral with a hollow spindle 69 which extends through an aperture in the carrier 67 and has its end threaded for securement by a nut. A spring 70 within the hollow block 69 serves to bias the rod 27 upwardly as previously mentioned.

As may be seen in Figs. 5 to 8 and 10, the carrier 67 is provided with an integral gear segment 71 which meshes with rack teeth 72 on a rack bar 73. The latter is slidable in a guide 74 carried by plate 64, and has extending ends 75 and 76 to which rods 77 and 78 are connected. These rods extend within a double-acting air cylinder 79 and are connected to a piston 80 within the cylinder. The cylinder is supported by plate 64. Pressurized air is supplied to the cylinder 79 through conduits 81 and 82. The movement of the rack bar 73 in opposite directions is limited by adjustable screws 83 and 84 which abut against the fixed plate 64.

By the above-described arrangement, the carrier 67 is movable in opposite directions through an arc of 180° to move the core 24 between the preform and blow molds. During the blowing and cooling operation, pressurized air is supplied to the tubular core through the bore 85 of spindle 69. A flexible tube or conduit 86 is secured to the upper end of spindle 69 and communicates with the bore 85 thereof.

Figure 14:
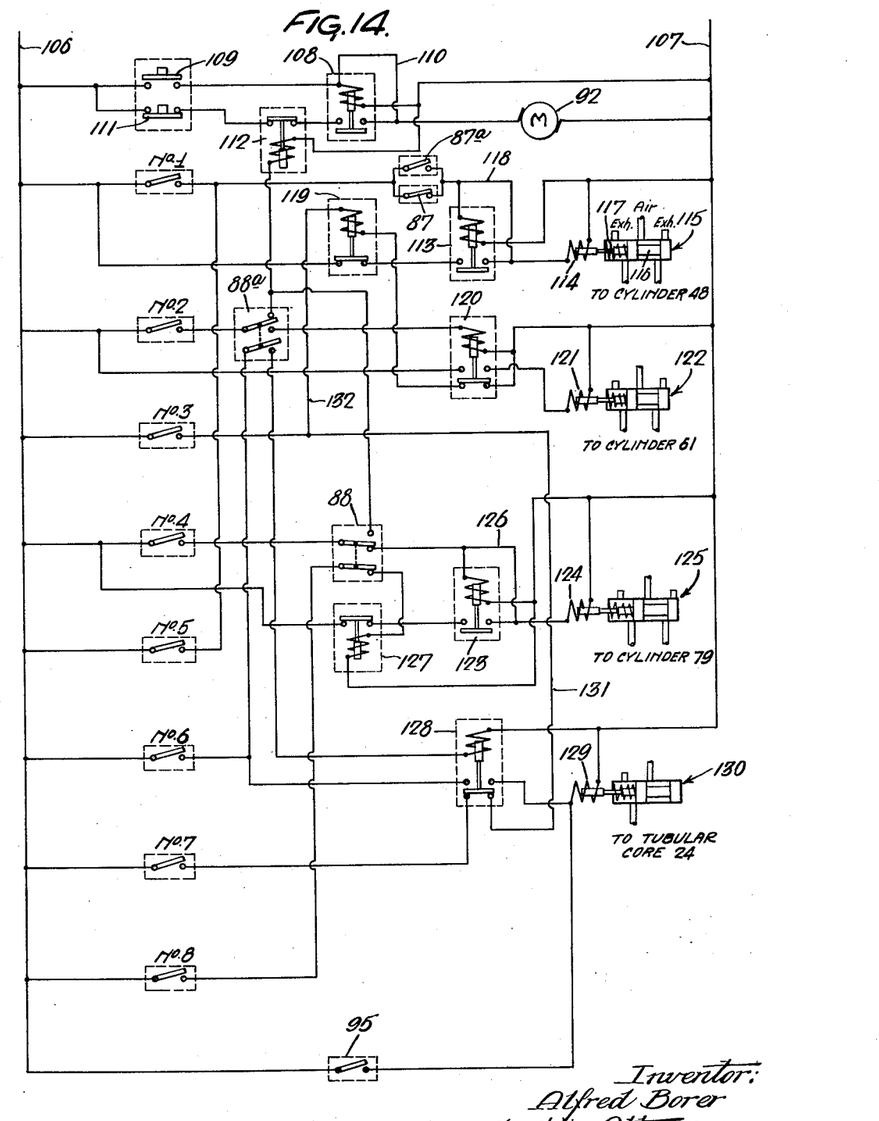
Fig. 14 is a diagrammatic illustration of an electrical system for performing the sequential operation.

The apparatus or machine hereinbefore described is preferably controlled automatically by means of the control system shown in Fig. 14. The sequential operation is effected by means of a series of micro-switches designated No. 1 to No. 8, and certain of the operating sequences are under control of micro-switches 87, 87a, 88 and 88a. As shown in Fig. 5, the sequence-controlling switches are adjustably mounted on a ring 89 within a control box 90, and a rotatable arm 91 is driven by a motor 92 through reduction gearing 93. The arm 91 is driven at a predetermined constant speed, and it successively actuates the sequence-controlling switches. These switches are spring-biased to open position. They are positionally adjusted on the supporting ring 89 to give the proper timing. In the illustration of Fig. 5 these switches are shown as being equally spaced but this is merely for simplicity of illustration.

The switches 87 and 87a (see Figs. 7 and 8) are spring-biased normally-open switches mounted on the opposite sides of plate 64 for operation by fingers 73a and 73b on the opposite ends of the movable rack bar 73. The purpose of these switches is to permit closing of the molds only when the rack bar is at either end of its stroke.

The switches 88 and 88a (see Fig. 5) are located respectively at the open and closed positions of the movable plate 38 and are operated by a cam projection 94 on said plate. These switches, as may be seen in Fig. 14, are double-throw switches which are spring-biased to one position and are actuated to the other position by the cam projection 94. The purpose of these switches is to guard against improper operation as hereinafter described.

The operating sequence is as follows:
1. The molds close.
2. The thermoplastic material is injected into the closed preform mold to form the preform.
3. The molds open.
4. The supporting core and the preform thereon are moved from the preform mold to the blow mold.
5. The molds close.
6. The blowing and cooling operation takes place.
7. The molds open.
8. The movable core, with the bottle thereon, moves back to the preform mold and in the course of its movement the bottle is blown off of the core.

It will be seen, therefore, that there are eight sequences which are controlled respectively by the switches No. 1 to No. 8.

Figures 8, 9:
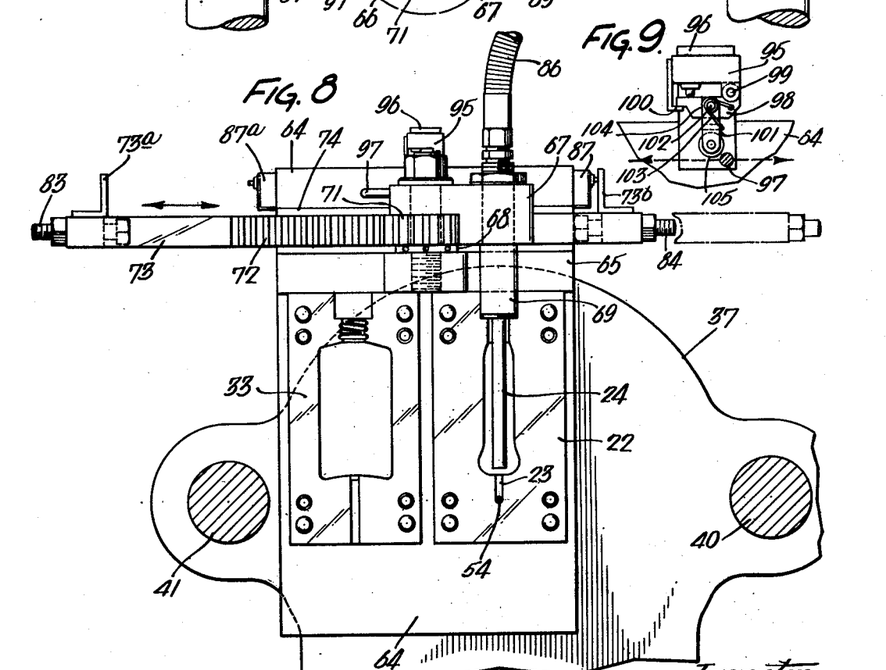
Fig. 8 is a face view of the stationary half-mold sections and the transferring mechanism.
Fig. 9 is a view taken along line 9—9 of Fig. 7, showing the switch which controls the ejection of the bottle after the blowing operation has been performed and the molds are open.

In the final sequence during which the bottle is blown from the supporting core, a switch 95 controls the air to eject the bottle. As may be seen in Figs. 7 to 9, this switch is mounted on a bracket 96 supported by plate 64, and a pin 97 extending from the movable carrier 67 serves to close the switch 95 only during return movement of the supporting core 24, from the blow mold to the preform mold. As shown in Fig. 9, an arm 98 is pivotally mounted at 99 and normally engages a stop 100. A second arm 101 is pivotally mounted at 102 on arm 98 and is biased by a spring 103 against a shoulder 104 on arm 98. During movement of pin 97 from left to right in Fig. 9, when the preform is moving from the preform mold to the blow mold, the pin engages a roller 105 on the end of arm 101 and merely pushes the arm out of the way without causing operation of switch 95. During movement of the pin in the opposite direction, i. e. from right to left in Fig. 9, when the supporting core with the bottle thereon is moving from the blow mold toward the preform mold, the pin 97 engages roller 105 and actuates arm 98 through arm 101 to momentarily close the switch 95. This causes a blast of air to be delivered to the supporting core, which blows the bottle off of the core.

Referring now to Fig. 14 for a detailed description of the operating sequence, the electrical components of the system, which may be mounted within the main base of the machine, are shown connected between current supply lines 106 and 107. The motor 92, which drives the rotatable arm 91 (see Fig. 5) is set into operation by energization of relay 108 through momentary closure of the normally-open push-button starting switch 109. The relay 108 locks itself in through connection 110, and thereafter the motor 92 runs continuously until such time as the normally-closed push-button stopping switch 111 is momentarily opened to deenergize relay 108. A safety relay 112 has its contacts included in the energizing circuit for relay 108. In the deenergized condition of relay 112, its contacts are closed, and in the event of energization of this relay it opens its contacts to cause deenergization of relay 108. This only occurs in the event of improper operation as hereinafter described.

Assuming that the motor 92 has been started, the machine will operate repeatedly through its operating sequence. Just prior to the commencement of an operating sequence, the molds are open as shown in Figs. 5 and 6, the movable plate 38 being in the solid line position of Fig. 5. Closure of sequence control switch No. 1 effects energization of relay 113 which energizes the solenoid 114 of a solenoid operated valve 115. The movable valve member 116 is biased toward the right as viewed in Fig. 14 by a spring 117, and in that position of the valve member, air is supplied to the upper end of the air cylinder 40 so that the movable plate 38 is held in the retracted position. However, energization of solenoid 114 effects movement of the valve member 116 to the left to cut off the supply of air to the upper end of cylinder 48 and to introduce air to the lower end of the cylinder. This causes actuation of plate 38 to the dot-and-dash position of Fig. 5 in which the molds are closed. Relay 113 locks itself in through connection 118 and the closed contacts of relay 119 and, therefore, the solenoid 114 remains energized until subsequent energization of relay 119, as hereinafter described.

It should be noted that switches 87 and 87a are parallel-connected in the energizing circuit of relay 113, and therefore, the relay can be energized only if one of these switches is closed. This insures against closing of the molds if the core 24 is not in proper position as determined by the position of rack bar 73.

The movement of the movable plate 38 to the mold-closing position causes movement of switches 88 and 88a from the positions shown in Fig. 14 to their other positions. Therefore, closure of sequence control switch No. 2 effects energization of relay 120 which energizes solenoid 121 of the solenoid-operated valve 122 which is similar to the valve 115. The valve 122 controls the supply of air to the double-acting air cylinder 61 which actuates the injection ram 60. In the normal position of the spring-biased valve 122, air is supplied to the left-hand end of cylinder 61, as viewed in Fig. 5, so that the ram 60 is retracted. Upon energization of solenoid 121, the air is cut off from the left-hand end of cylinder 61 and is supplied to the right-hand end of the cylinder to drive the ram 60 forwardly. Relay 120 has a time delay drop-out and it maintains energization of solenoid 121 long enough for completion of the injection stroke of the ram 60.

It should now be noted that in the event the molds were not fully closed, switch 88a would remain in the position shown in Fig. 14, and the closure of the sequence control switch No. 2 would cause energization of relay 112 to stop the motor 92. Furthermore, relay 120 would not be energized, and the injection operation would not take place. Thus, the switch 88a insures against injection of the thermoplastic material if the molds are open.

The next step in the operating sequence is the closure of sequence control switch No. 3 which energizes relay 119 to effect deenergization of relay 113 which, in turn, effects deenergization of solenoid 114. Consequently, the spring-biased valve member 116 returns to its normal position and effects movement of the movable plate 38 to its retracted position, thus opening the molds. It should be noted that the lower contacts of relay 120 are included in the energizing circuit for relay 119, and therefore relay 119 cannot be energized to cause opening of the molds unless the time-delay relay 120 has dropped out and the injection operation has terminated. This prevents opening of the molds while the injection operation is still in progress. Of course, in the proper operation of the system, the injection operation has terminated by the time switch No. 3 closes.

The next step in the operating sequence is the closing of switch No. 4. It should be noted that switch 88 is now in the position shown in Fig. 14 due to the fact that plate 38 is in its retracted position. Therefore, closure of switch No. 4 energizes relay 123 which energizes the operating solenoid 124 for valve 125 which is similar to the valves 115 and 122. The valve 125 controls the supply of air to the air cylinder 79 which operates the carrier 67 through the rack bar 73 and the associated gear segment 71. In its normal condition, the valve 125 supplied air to the right-hand end of cylinder 79, as viewed in Fig. 7 so that the carrier 67 is in the right-hand position as shown. However, energization of solenoid 124 causes valve 125 to shut off the air from the right-hand end of cylinder 79 and to supply air to the left-hand end of the cylinder. This causes movement of rack bar 73 toward the right to the position indicated in dot-and-dash outline in Fig. 7, and consequent movement of the carrier 67 to the left-hand position. Movement of the carrier transfers the preform from the preform mold to the blow mold. Relay 123 locks itself in through connection 126 and the closed contacts of relay 127, so that the solenoid 124 is maintained energized until later energization of relay 127, as hereinafter described. The movement of rack bar to the right causes opening of switch 87 and closure of switch 87a.

The next step in the operating sequence is the closure of switch No. 5 which energizes relay 113 and thus causes closure of the molds as previously described. It should be noted that with the molds again closed, switches 88 and 88a are moved from the position shown in Fig. 14 to their other positions.

The next step in the operating sequence is the closure of switch No. 6 which energizes relay 128 through the lower contacts (now closed) of switch 88a. Relay 128 energizes solenoid 129 which operates the spring-biased valve 130. Operation of this valve introduces air to the tubuluar core 24 to blow the preform in the blow mold to the size and shape of the desired bottle. It should be noted that switch 88a will permit the blowing operation to commence only if the molds are fully closed, for if the molds are not fully closed the lower contacts of switch 88a will be open and will prevent energization of relay 128. The latter relay has a time delay drop-out characteristic so that it maintains energization of solenoid 129 for a predetermined period of time sufficient to blow and cool the bottle.

The next step in the operating sequence is the closure of switch No. 7 which energizes relay 119 through the lower contacts of relay 128 and connections 131 and 132, to cause opening of the molds as previously described. It should be noted that the lower contacts of relay 128 permit opening of the molds only if relay 128 has dropped out, and the blowing operation has terminated.

The next step in the operating sequence is the closure of switch No. 8 which energizes relay 127 through the lower contacts (now closed) of switch 88. The energization of relay 127 effects deenergization of relay 123 and thus effects deenergization of solenoid 124. The spring-biased valve 125 thereupon returns to its normal position and effects return movement of carrier 67 through the operation of air cylinder 79. During this movement of the carrier, and when the returning core with the bottle thereon is clear of the molds, the pin 97 (Figs. 7 to 9) momentarily closes switch 95 as hereinbefore described. As may be seen in Fig. 14, the momentary closure of switch 95 energizes solenoid 129 which actuates valve 130 to supply a blast of air to the core. This forcibly ejects the bottle from the core, and the core continues its return movement to the preform mold. The apparatus is then in condition for repeat operation.

As previously stated, it is particularly important in the above-described operating sequence that the preform be produced and transferred to the blow mold within a time interval from the commencement of injection sufficiently short to preclude detrimental setting of the thermoplastic material, and the said interval preferably does not exceed approximately seven seconds as this insures consistent production of satisfactory bottles. Referring again to Fig. 14, the injection operation is instituted by the closure of sequence control switch No. 2; the time of the injection operation is determined by the time delay drop-out characteristic of relay 120; the opening of the molds is effected by closure of sequence control switch No. 3; the transfer of the preform from the preform mold to the blow mold is effected by closure of sequence control switch No. 4; and the closure of the molds is effected by the closure of sequence control switch No. 5. The four sequences instituted by switches Nos. 2 to 5 must take place within a time interval sufficiently short to preclude detrimental setting of the thermoplastic material. Therefore, for a given speed of rotation of arm 91 (Fig. 5) the control switches must be spaced sufficiently close to effect the four operating sequences above-mentioned within a very short time interval that preferably does not exceed approximately seven seconds. It is also important that the relay 120 precisely governs the injection operation so that the succeeding sequences may take place as quickly as possible. The injection operation requires only a very short time, for example about two seconds and, therefore, the relay 120 has a precise short delay characteristic.

It is also important that the blowing operation take place immediately following the closure of the blow mold after the preform has been transferred thereto. Sequence control switch No. 6 institutes the blowing action which blows the preform to produce the desired bottle, and which also cools the bottle to effect setting of the thermoplastic material. It is important, therefore, that switch No. 6 be in such spaced relation to switch No. 5 that the blowing operation will be instituted immediately following closure of the blow mold. As previously mentioned, the blowing of the bottle requires only about a second or several seconds at the most, and the total blowing and cooling time may be from about fifteen seconds to about forty seconds, depending upon the size and weight of the bottle. The time delay drop-out characteristic of relay 128, which controls the blowing time is, therefore, relatively great in comparison to the time delay characteristic of relay 120.

The above-described apparatus is well adapted to effect the rapid operations which are necessary for success of the method. The provision of preform and blow molds in side-by-side relation and composed of stationary and movable half-mold sections and the arrangement of the preform carrier to move through an arc of 180° about an axis midway between the molds, constitute important features of the apparatus which contribute greatly toward its ability to perform the necessary operations with sufficient rapidity.

Figure 15:
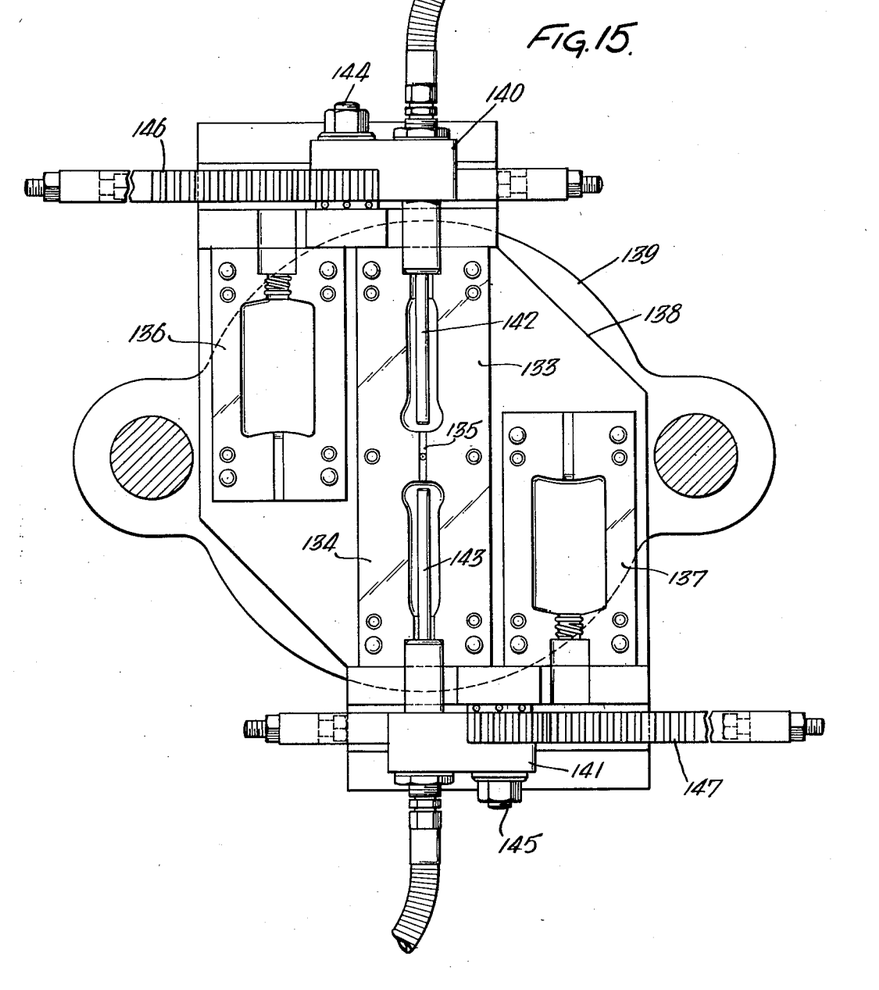
Fig. 15 is a face view of the stationary half-mold sections in a modified form of the apparatus.

Referring now to Fig. 15, there is shown a modified form of the apparatus in which two preform molds and two blow molds are provided so that two bottles may be produced at the same time. Fig. 15 is a view, similar to Fig. 8, looking at the stationary half-mold sections. In this instance, two preform molds 133 and 134 are provided in aligned relationship and are fed from a common injection device through a common passage 135. Two blow molds 136 and 137 are provided respectively in side-by-side association with the preform molds 133 and 134. The half-mold sections shown in Fig. 15 are mounted on a plate 138 carried by the stationary plate 139. Carriers 140 and 141 serve to support the tubular cores 142 and 143. The carriers are movable respectively about pins 144 and 145 by means of rack bars 146 and 147, as in the previously described apparatus.

The modified form of apparatus shown in Fig. 15 may be operated in the same manner as the first-described apparatus. In the control system of Fig. 14, it is merely necessary to have air cylinders for the rack bars 146 and 147 supplied with pressurized air under control of valve 125, and to have the tubular cores 142 and 143 supplied with pressurized air under control of valve 130.

From the foregoing description, it will be seen that the present invention provides a method and apparatus for the successful application of the injection method to the production of plastic bottles. While certain embodiments have been illustrated and described for the purpose of disclosure, it will be understood that the invention is not limited thereto, but contemplates such modifications and other embodiments as may be utilized without departing from the invention.

I claim:

1. Apparatus for the making of hollow articles, such as bottles, of thermoplastic material, comprising means for heating the thermoplastic material sufficiently to enable working thereof, a stationary plate, a second plate parallel to said stationary plate and movable toward and away from the same, a preform mold composed of two half-mold sections carried by the respective plates, a blow mold composed of two half-mold sections carried by the respective plates in spaced relation to the sections of said preform mold, a tubular elongate core mounted for movement about a pivot midway between said molds through an arc of 180° to transfer the core between said molds, means for injecting the heated thermoplastic material into the closed preform mold with said core therein to form an elongate preform suitable for blowing to the final size and shape of the desired article, means for moving said movable plate away from said stationary plate so as to open said molds, means for moving said core and the preform thereon from the preform mold to the mold within a time interval from the commencement of injection into the preform mold sufficiently short to preclude detrimental setting of the thermoplastic material, means for closing the molds, means for introducing pressurized air through said tubular core into the preform in the blow mold to blow the preform to the size and shape of the desired article and to cool the formed article sufficiently to effect substantially complete setting of the thermoplastic material, means for moving said movable plate away from said stationary plate to open said molds, and means for moving said core back through the 180° arc to enable removal of the formed article and to reinsert the core in the preform mold.

2. Apparatus for the making of hollow articles, such as bottles, of thermoplastic material, comprising means for heating the thermoplastic material sufficiently to enable working thereof, a stationary plate, a second plate parallel to said stationary plate and movable toward and away from the same, a preform mold composed of two half-mold sections carried by the respective plates, a blow mold composed of two half-mold sections carried by the respective plates in spaced relation to the sections of said preform mold, a tubular elongate core mounted for movement about a pivot midway between said molds through an arc of 180° to transfer the core between said molds, means for injecting the heated thermoplastic material into the closed preform mold with said core therein to form an elongate preform suitable for blowing to the final size and shape of the desired article, means for moving said movable plate away from said stationary plate so as to open said molds, means for moving said core and the preform thereon from the preform mold to the blow mold within a time interval from the commencement of injection into the preform mold sufficiently short to preclude detrimental setting of the thermoplastic material, means for closing the molds, means for introducing pressurized air through said tubular core into the preform in the blow mold to blow the preform to the size and shape of the desired article and to cool the formed article sufficiently to effect substantially complete setting of the thermoplastic material, means for moving said movable plate away from said stationary plate to open said molds, means for moving said core back through the 180° arc to enable removal of the formed article and to reinsert the core in the preform mold, and means for effecting air ejection of the article from the core in the course of return of the core to the preform mold.

3. Apparatus for the making of hollow articles, such as bottles, of thermoplastic material, comprising means for heating the thermoplastic material sufficiently to enable working thereof, a stationary plate, a second plate parallel to said stationary plate and movable toward and away from the same, a preform mold composed of two half-mold sections carried by the respective plates, a blow mold having its longitudinal axis in spaced parallel relation to the longitudinal axis of the preform mold and also composed of two half-mold sections carried by the respective plates, a tubular elongate core mounted for movement about an axis parallel to and midway between said axes through an arc of 180° to transfer the core between said molds, means for injecting the heated thermoplastic material into the closed preform mold with said core therein to form an elongate preform suitable for blowing to the final size and shape of the desired article, means for moving said movable plate away from said stationary plate so as to open said molds, means for moving said core and the preform thereon from the preform mold to the blow mold within a time interval from the commencement of injection into the preform mold sufficiently short to preclude detrimental setting of the thermoplastic material, means for closing the molds, means for introducing pressurized air through said tubular core into the preform in the blow mold to blow the preform to the size and shape of the desired article and to cool the formed article sufficiently to effect substantially complete setting of the thermoplastic material, means for moving said movable plate away from said stationary plate to open said molds, and means for moving said core back through the 180° arc to enable removal of the formed article and to reinsert the core in the preform mold.

4. Apparatus for the making of hollow articles, such as bottles, of thermoplastic material, comprising means for heating the thermoplastic material sufficiently to enable working thereof, a stationary plate, a second plate parallel to said stationary plate and movable toward and away from the same, a preform mold composed of two half-mold sections carried by the respective plates, a blow mold composed of two half-mold sections carried by the respective plates in spaced relation to the sections of said preform mold, a hollow elongate core mounted for movement about a pivot midway between said molds through an arc of 180° to transfer the core between said molds, a spring-biased closure element at the free end of said core, means for injecting the heated thermoplastic material into the closed preform mold with said core therein to form an elongate preform suitable for blowing to the final size and shape of the desired article, means for moving said movable plate away from said stationary plate so as to open said molds, means for moving said core and the preform thereon from the preform mold to the blow mold within a time interval from the commencement of injection into the preform mold sufficiently short to preclude detrimental setting of the thermoplastic material, means for closing the molds, means for introducing pressurized air through said hollow core into the preform in the blow mold to blow the preform to the size and shape of the desired article and to cool the formed article sufficiently to effect substantially complete setting of the thermoplastic material, means for moving said movable plate away from said stationary plate to open said molds, and means for moving said core back through the 180° arc to enable removal of the formed article and to reinsert the core in the preform mold.

References Cited in the file of this patent

UNITED STATES PATENTS

| 2,290,129 | Moreland et al. | July 14, 1942 |
| 2,298,716 | Moreland et al. | Oct. 13, 1942 |
| 2,331,702 | Kopitke | Oct. 12, 1943 |
| 2,349,177 | Kopitke | May 16, 1944 |
| 2,353,825 | Hoffman | July 18, 1944 |

FOREIGN PATENTS

| 882,497 | France | Mar. 1, 1943 |